C. SEITER.
POST HOLE DIGGER.
APPLICATION FILED NOV. 24, 1916.
1,261,859.
Patented Apr. 9, 1918.
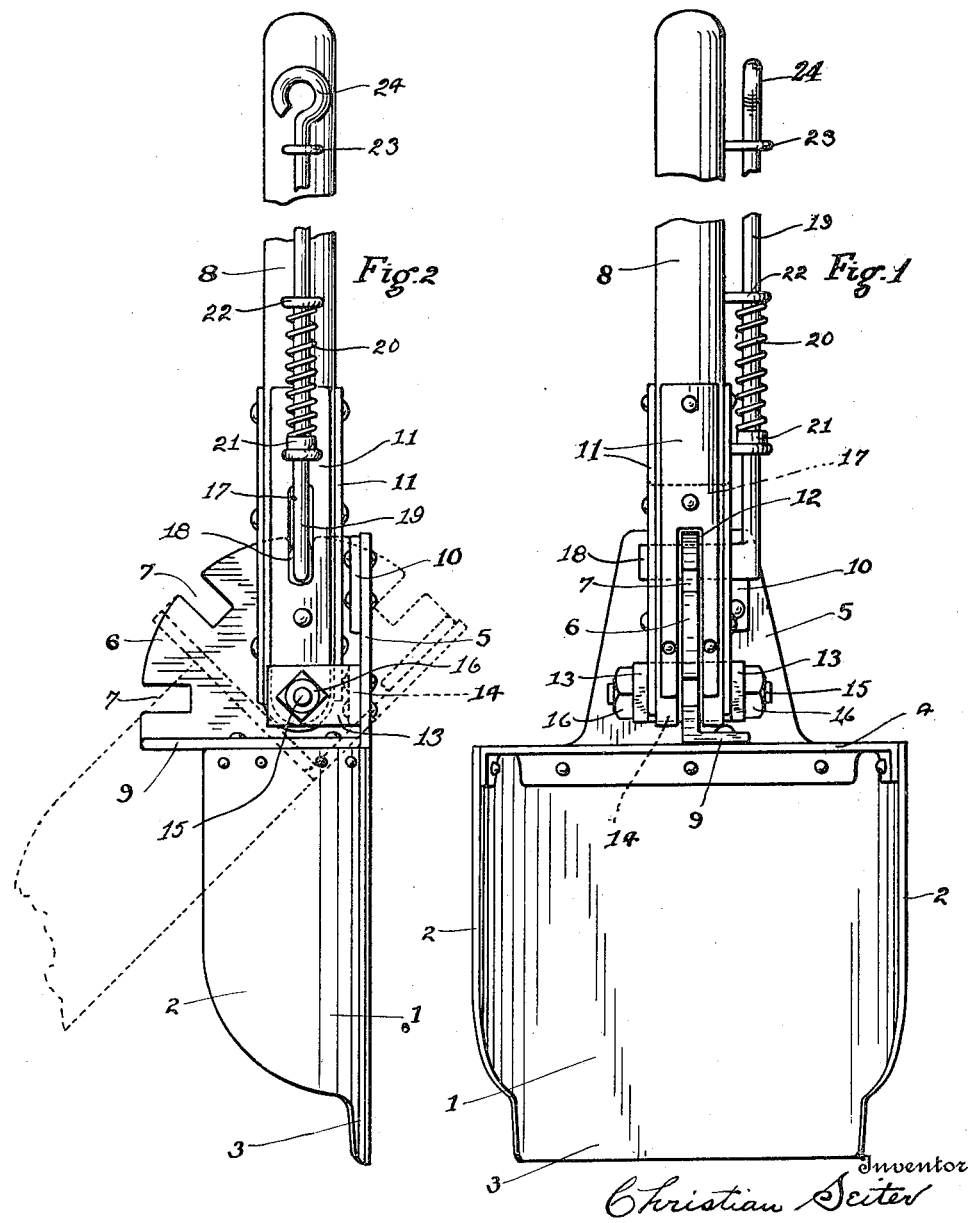
Inventor
Christian Seiter
Witness
R. M. McConnel
A. L. Phelps
By
C. C. Shepherd
Attorney

UNITED STATES PATENT OFFICE.

CHRISTIAN SEITER, OF COLUMBUS, OHIO.

POST-HOLE DIGGER.

1,261,859.     Specification of Letters Patent.     Patented Apr. 9, 1918.

Application filed November 24, 1916. Serial No. 133,105.

*To all whom it may concern:*

Be it known that I, CHRISTIAN SEITER, a citizen of the United States, residing at Columbus, in the county of Franklin and State of Ohio, have invented certain new and useful Improvements in Post-Hole Diggers, of which the following is a specification.

This invention relates to post hole diggers and aims particularly to provide a tool which may be used for the double purpose of loosening the ground and also permitting or causing its easy excavation.

In this connection, it is the main object of this invention to so construct the shovel portion that a projecting tongue is formed which projects beyond the sides thereof so that this shovel blade may be rammed into the ground to loosen the same. After this, certain mechanism is actuated whereby the shovel portion is moved to a position substantially at right angles to the handle and this loosened ground may then be excavated or removed.

Another object of the invention resides in the specific construction whereby the shovel portion is attached to the handle portion to permit it to assume its various positions of angularity with the handle.

The preferred embodiment of my invention is shown in the accompanying sheet of drawings, in which similar characters of reference designate corresponding parts, and in which:

Figure 1 is a front elevation of my improved type of post hole digger, and,

Fig. 2 is a side view of the structure shown in Fig. 1, the dotted lines representing the shovel portion in one of its angular positions.

In these views, the shovel is designated by the reference numeral 1 and it is formed to present sides 2, which stop short of the blade or tongue portion 3. This tongue portion is a continuation of the bottom of the shovel, but projects beyond the sides to enable the device to be used in loosening the ground. A rear side 4 is also placed, as is shown, to prevent the dirt from falling out the rear end. The base is also projected rearwardly to form an apron 5 to which the arcuate quadrant 6, is attached. This quadrant is provided with a plurality of notches 7 which coöperate with the latch mechanism carried by the handle 8 to hold the shovel in any one of a plurality of positions. This quadrant is secured to the back 4 by means of the flange shown at 9 and to the apron 5 by means of the flange shown at 10, so that a rigid construction is provided. In addition, the lower end of the handle 8 is reinforced by the metal portion 11 and is also cut out as shown at 12 to straddle the quadrant. On each side of the lower end of the handle, there is located an arm 13 which projects up from the apron 5, these arms being formed integral with each other through the medium of the cross piece connection 14. These arms 13 are located apart a distance to permit the handle to slip into position and thus they will lie on the outside of the handle. The handle is itself pivoted to the shovel by means of these arms 13 and the bolt shown at 15. The arms 13 are made sufficiently rigid so that they are not drawn into clamping engagement with the handle 8 when the nuts 16 are tightened and in this manner, the handle has a free pivotal connection with the shovel. The lower end of the handle is also slotted transversely, as shown at 17 and it is through this transverse slot that the right angular portion 18 of the locking rod 19 operates. This locking rod extends throughout the greater portion of the length of the handle 8, but its portion 18 is normally held in a position of engagement with one of the notches 7 by means of the coiled spring shown at 20. This coiled spring rests against a collar 21 at its lower end, rigidly secured to the rod 19 and against the staple 22 at its upper end. This staple 22 in connection with the staple 23 forms a means for guiding the locking rod in its up and down movement. At its upper end, this locking rod is provided with an eye 24 which may be readily grasped by the operator when it is desired to change the position of the shovel.

In digging a post hole, the shovel portion is moved to the position shown in full lines in Fig. 2 and in this position it is used after the manner of a crow bar in loosening the earth. After a sufficient quantity has been loosened, the locking rod 19 is grasped and elevated slightly to bring its right angular portion 18 out of engagement with the corresponding notch 7 in the quadrant 6. This allows the shovel to swing freely about its pivot bolt 15 and this shovel may then be moved to a position to lie at substantially right angles to the handle. In this position, the locking rod is again released and its portion 18 falls into engagement with the proper notch 7. Thus, the device may be used to easily excavate all the loosened material. It will also be understood that after the hole has reached a considerable depth, this moving of the shovel from a vertical to a horizontal position may be accomplished during the act of scooping the loosened earth.

What I claim, is:

A post hole digger comprising a shovel, a rearwardly projecting apron carried by said shovel, a notched quadrant secured to said apron, a handle, the lower end of which straddles said quadrant, a pair of pivot arms rigidly secured to said apron, said arms being located to lie on the outside of the lower ends of said handle, a pivot bolt passing through said arms and the lower end of said handle, a locking rod slidably secured to said handle, the lower end of said handle having a transverse slot, and a right angular projection on the lower end of said rod passing through said slot to coöperate with said notched quadrant.

In testimony whereof I affix my signature in presence of two witnesses.

CHRISTIAN SEITER.

Witnesses:
C. C. SHEPHERD,
A. L. PHELPS.

Copies of this patent may be obtained for five cents each, by addressing the "Commissioner of Patents. Washington, D. C."